US008910302B2

(12) United States Patent
Johansson

(10) Patent No.: US 8,910,302 B2
(45) Date of Patent: *Dec. 9, 2014

(54) MEDIA RIGHTS MANAGEMENT ON MULTIPLE DEVICES

(75) Inventor: Kay Johansson, Alamo, CA (US)

(73) Assignee: MobiTV, Inc., Emeryville, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 13/220,435

(22) Filed: Aug. 29, 2011

(65) Prior Publication Data
US 2012/0054876 A1 Mar. 1, 2012

Related U.S. Application Data

(60) Provisional application No. 61/378,189, filed on Aug. 30, 2010.

(51) Int. Cl.
H04N 7/16 (2011.01)
H04N 21/854 (2011.01)
H04L 29/06 (2006.01)
H04N 21/845 (2011.01)

(52) U.S. Cl.
CPC ...... *H04N 21/85406* (2013.01); *H04L 65/4084* (2013.01); *H04L 65/1093* (2013.01); *H04L 65/80* (2013.01); *H04N 21/8455* (2013.01); Y10S 705/908 (2013.01)
USPC ...... 726/28; 726/4; 726/29; 725/25; 725/109; 705/908; 709/231; 709/236

(58) Field of Classification Search
USPC .............. 726/2, 4, 19, 21, 26–29; 705/51, 67, 705/904, 59, 902, 901, 908; 725/25, 109; 709/224–226, 231, 236
See application file for complete search history.

(56) References Cited

U.S. PATENT DOCUMENTS

| 2002/0022453 | A1* | 2/2002 | Balog et al. ...................... 455/41 |
| 2004/0139169 | A1 | 7/2004 | O'Brien et al. |
| 2004/0250273 | A1* | 12/2004 | Swix et al. ...................... 725/25 |
| 2006/0277151 | A1* | 12/2006 | Sankaran et al. ............... 705/59 |
| 2007/0167175 | A1* | 7/2007 | Wong et al. ................ 455/456.5 |
| 2008/0010653 | A1* | 1/2008 | Ollikainen et al. ............. 725/25 |
| 2008/0279112 | A1* | 11/2008 | Schryer et al. ................ 370/252 |
| 2009/0094662 | A1* | 4/2009 | Chang et al. ................... 725/141 |
| 2009/0297123 | A1* | 12/2009 | Virdi et al. ...................... 386/69 |
| 2010/0100899 | A1 | 4/2010 | Bradbury et al. |
| 2010/0131973 | A1* | 5/2010 | Dillon et al. ..................... 725/27 |
| 2010/0306407 | A1* | 12/2010 | Oman ........................... 709/236 |

(Continued)

OTHER PUBLICATIONS

Qiong Liu et al, Digital Rights Management for Content Distribution, Australian Computer Society, 2003.*

(Continued)

*Primary Examiner* — David Garcia Cervetti
*Assistant Examiner* — Shanto M Abedin
(74) *Attorney, Agent, or Firm* — Kwan & Olynick LLP

(57) ABSTRACT

Media rights are managed to include not just device authentication, but to include elements of user, device, and service authorization. A user can play media on a mobile device, continue playing the media on a desktop computer, and subsequently move to a large screen television and media rights are automatically identified to provide the most appropriate authorized content. This allows an authorized user to seamlessly access different forms of the same content on a variety of authenticated devices using the same digital rights management mechanisms.

18 Claims, 7 Drawing Sheets

(56) References Cited

U.S. PATENT DOCUMENTS

2011/0016204 A1* 1/2011 Wiener et al. ............. 709/224
2011/0213688 A1* 9/2011 Santos et al. ............. 705/34
2012/0011567 A1* 1/2012 Cronk et al. ............. 726/4

OTHER PUBLICATIONS

"International Application Serial No. PCT/US2011/049597, Search Report and Written Opinion mailed Dec. 6, 2011", 10 pgs.

* cited by examiner

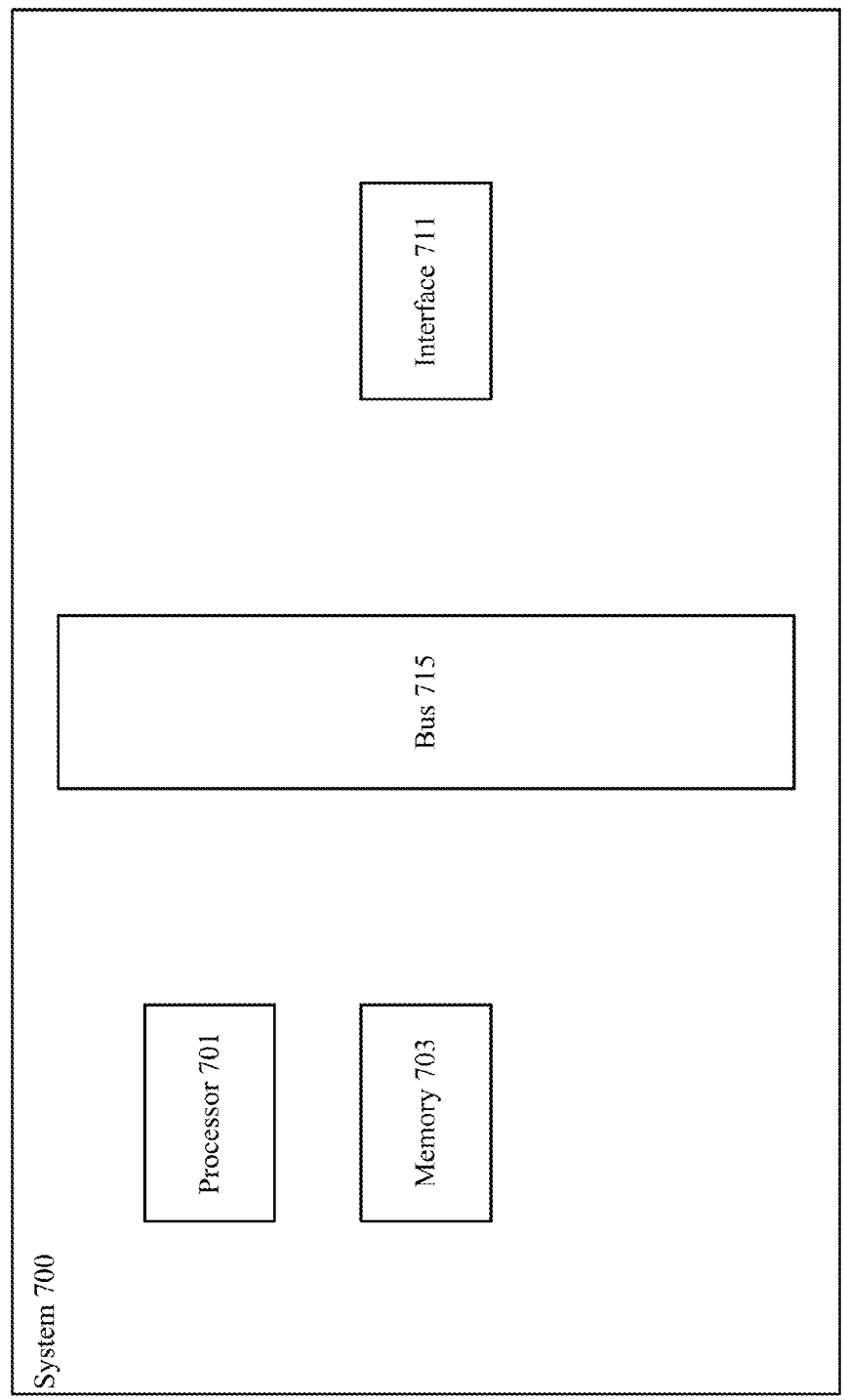

MEDIA RIGHTS MANAGEMENT ON MULTIPLE DEVICES

CROSS-REFERENCE TO RELATED APPLICATION

This application claims the benefit of priority under 35 U.S.C. §119(e) to U.S. Provisional Application No. 61/378,189, titled "MEDIA RIGHTS MANAGEMENT ON MULTIPLE DEVICES," filed Aug. 30, 2010, the entirety of which is incorporated in its entirety by this reference for all purposes.

TECHNICAL FIELD

The present disclosure relates to media rights management on multiple devices.

DESCRIPTION OF RELATED ART

Rights management for television or video services commonly relies on device or regional authentication. A set top box may be authorized to receive a particular set of channels. Different viewers using the same set top box can all view those channels regardless of what the set top box is connected to. In other examples, a user may enter a name and password to get access to particular downloadable content. The content can then be viewed on any number of computer systems and devices.

However, mechanisms for managing media rights across devices are limited. Consequently, it is desirable to provide improved mechanisms for media rights management.

BRIEF DESCRIPTION OF THE DRAWINGS

The disclosure may best be understood by reference to the following description taken in conjunction with the accompanying drawings, which illustrate particular embodiments.

FIG. 7 illustrates one example of a system for implementing fragmented media delivery.

DESCRIPTION OF EXAMPLE EMBODIMENTS

Figure 1:
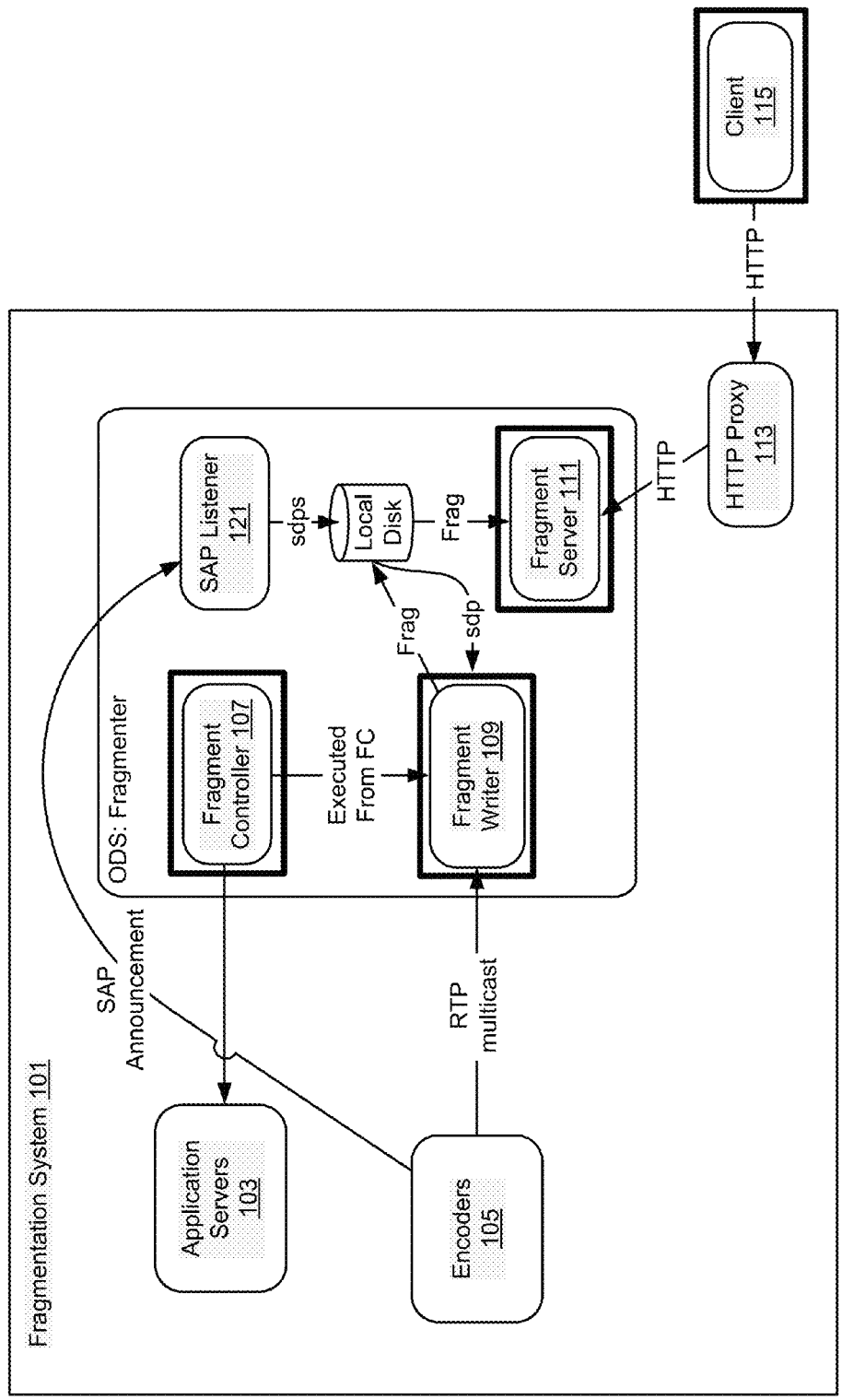
FIG. 1 illustrates one example of a media delivery system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of a particular type of encoding. However, it should be noted that the techniques of the present invention apply to a wide variety of encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Media rights are managed to include not just device authentication, but to include elements of user, device, and service authorization. A user can play media on a mobile device, continue playing the media on a desktop computer, and subsequently move to a large screen television and media rights are automatically identified to provide the most appropriate authorized content. This allows an authorized user to seamlessly access different forms of the same content on a variety of authenticated devices using the same digital rights management mechanisms.

Example Embodiments

Rights management for conventional for television or video services is typically limited to device authentication or regional authentication. A set top box is authenticated to receive certain channel packages. A digital video disc (DVD) player is authenticated to play DVDs for a particular region. A television receives broadcasts of games that are not under black out for the region. However, it is recognized right management can be more fine tuned than rough rights management using device or regional authentication. For example, a user watching a program on a single user mobile device may want to seamlessly continue watching the program on a multiple user large screen television that may or may not reside in the same geographic region. Conventional authentication and media rights management mechanisms do not efficiently handle authentication and authorization across multiple disparate devices in a variety of locations, some of which may be shared by multiple users.

According to various embodiments, user authorization and device authentication are separated. In particular embodiments, a user is authorized on multiple devices or multiple devices may be registered so that user impact is minimal. On a multiple user device such as a set top box, a user can log in for every session or for as long as the device is operating. A particular pin or password may be used on a set top box for the user to access personalized content or content particular to the user.

In particular embodiments, content is managed so that there is an identification of what the user is authorized to view on what devices at what quality levels and when. In some examples, a user may be authorized to view an entire channel package in low resolution but only particular channels in high resolution. In other examples, a user may be authorized to view a particular program on a personalized device such as a mobile phone or a computer but not on a multiple user device such as a set top box. In still other examples, a user may be allowed to view a program for a week on a large screen television using WiFi but forever on a mobile device. In yet other examples, a user may be able to access a ringtone version of a piece of media content but not a full version of the content.

According to various embodiments, a user may have unlimited access to all content across all devices but only when the user is in the vicinity of the device based on mobile device location data. In particular embodiments, authorizing a service includes keeping track of what products, channel packages, content packages, media programs, etc., that the user has purchased or rented and for how many devices simultaneously. In some examples, content may be authorized only if the device is located in a particular area, and black outs could be managed by limiting content in certain locations but allowing the same content when a mobile device moves to another region. Black outs could also be managed by allowing payment for viewing in a region under black out restrictions.

According to various embodiments, the same digital rights management (DRM) technology is used on all platforms. In particular embodiments, content is purchased with a particular level of rights. The content purchased is associated with fields that identify the level of rights for the user. In particular embodiments, a user may have purchased a television program at a particular quality level and resolution for viewing on up to two devices simultaneously forever. In another example, a user may have purchased a movie at all quality levels for viewing on any one authenticated device.

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

Conventional MPEG-4 files require that a player parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be recorded and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be handled using fragmentation.

According to various embodiments, playback stoppage is detected at a content server or fragmentation server. In some examples, a device sends a playback stoppage request. In other examples, a content server detects that a subsequent fragment request has not been received. The content server maintains user information and media stream position information. In some examples, the content server also maintains device information and quality or bit rate data. When a request for a fragment or a resume request is received from the same device, or from a different device associated with the same user, the content server identifies bit rate and the media stream along with the appropriate fragment to send to the user. The fragment may correspond to media data transmitted in the past as a live feed and may no longer be live, but the user is able to continue viewing the media stream in a seamless manner at a resolution appropriate for a current viewing device.

The request from the device may include a bit rate and resolution, or a content server may identify an appropriate bit rate and resolution using device information. A resume request along with a desired bit rate may also be received from a different device associated with a user. Fragments maintained at a content server may be used to respond to requests from numerous users on a variety of devices requesting playback of media streams at different points in time and at different quality levels. According to various embodiments, fragments can be maintained once at different quality levels and cached efficiently even though a variety of disparate requests for the same or different media streams will be received.

FIG. 1 is a diagrammatic representation illustrating one example of a fragmentation system 101 associated with a content server that can use the techniques and mechanisms of the present invention. Encoders 105 receive media data from satellite, content libraries, and other content sources and sends RTP multicast data to fragment writer 109. The encoders 105 also send session announcement protocol (SAP) announcements to SAP listener 121. According to various embodiments, the fragment writer 109 creates fragments for live streaming, and writes files to disk for recording. The fragment writer 109 receives RTP multicast streams from the encoders 105 and parses the streams to repackage the audio/video data as part of fragmented MPEG-4 files. When a new program starts, the fragment writer 109 creates a new MPEG-4 file on fragment storage and appends fragments. In particular embodiments, the fragment writer 109 supports live and/or DVR configurations.

The fragment server 111 provides the caching layer with fragments for clients. The design philosophy behind the client/server API minimizes round trips and reduces complexity as much as possible when it comes to delivery of the media data to the client 115. The fragment server 111 provides live streams and/or DVR configurations.

The fragment controller 107 is connected to application servers 103 and controls the fragmentation of live channel streams. The fragmentation controller 107 optionally integrates guide data to drive the recordings for a global/network DVR. In particular embodiments, the fragment controller 107 embeds logic around the recording to simplify the fragment writer 109 component. According to various embodiments, the fragment controller 107 will run on the same host as the fragment writer 109. In particular embodiments, the fragment controller 107 instantiates instances of the fragment writer 109 and manages high availability.

According to various embodiments, the client 115 uses a media component that requests fragmented MPEG-4 files, allows trick-play, and manages bandwidth adaptation. The client communicates with the application services associated with HTTP proxy 113 to get guides and present the user with the recorded content available.

Figure 2:
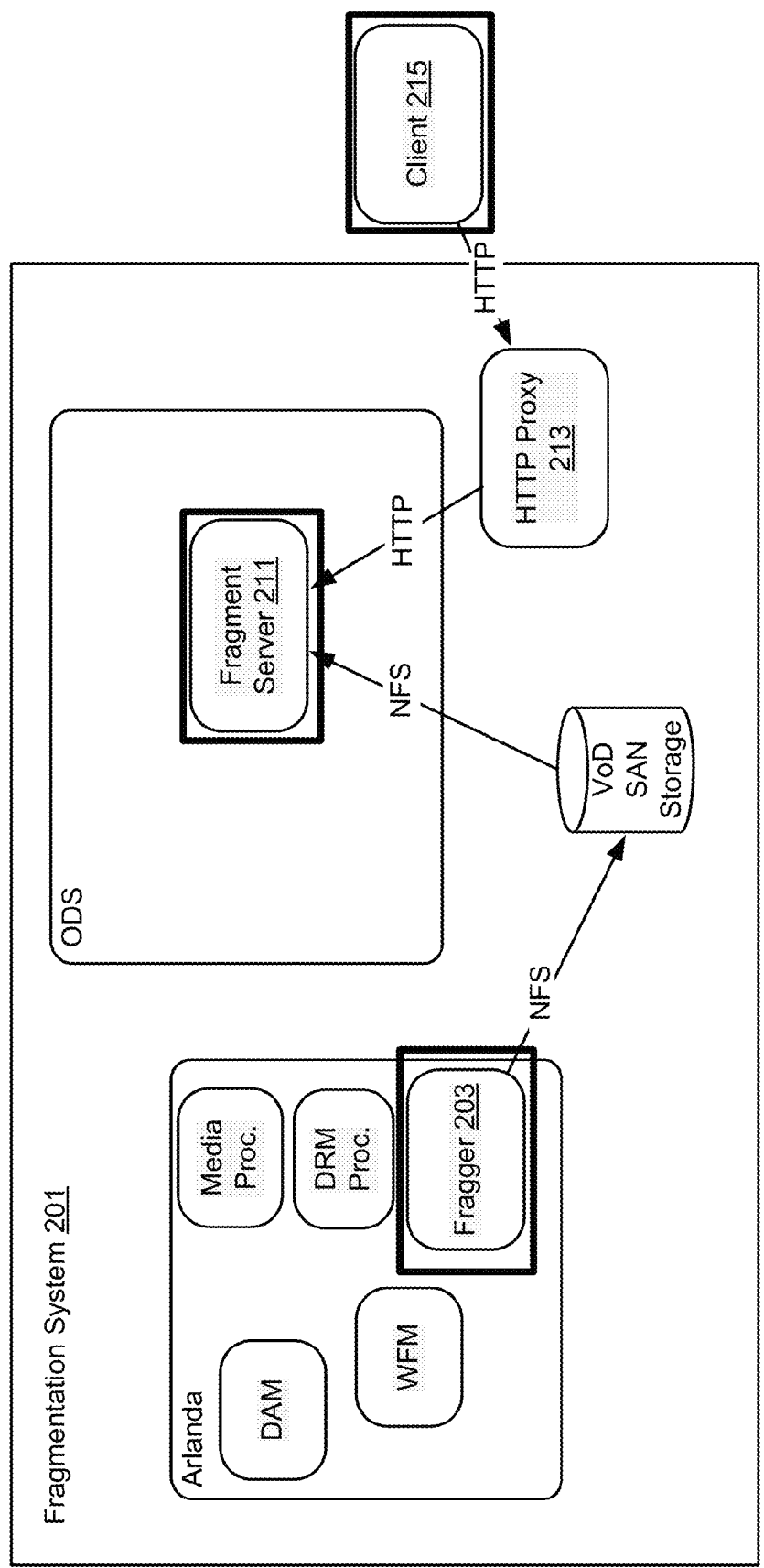
FIG. 2 illustrates another example of a media delivery system.

FIG. 2 illustrates one example of a fragmentation system 201 that can be used for video on demand content. Fragger 203 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 211 provides the caching layer with fragments for clients. The design philosophy behind the client/server API minimizes round trips and reduces complexity as much as possible when it comes to delivery of the media data to the client 215. The fragment server 211 provides VoD content.

According to various embodiments, the client 215 uses a media component that requests fragmented MPEG-4 files, allows trick-play, and manages bandwidth adaptation. The client communicates with the application services associated with HTTP proxy 213 to get guides and present the user with the recorded content available.

Figure 3:
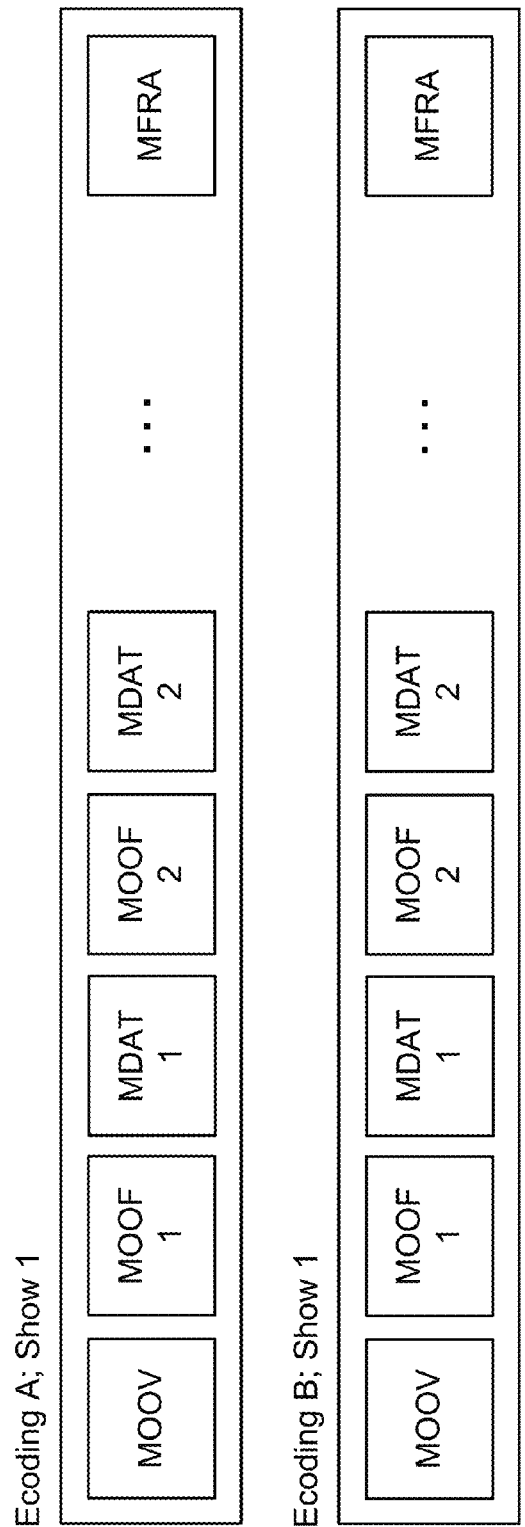
FIG. 3 illustrates examples of encoding streams.

FIG. 3 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format:

http://{HOSTNAME}/frag/{CHANNEL}/{BITRATE}/[{ID}/]{COMMAND}[/{ARG}]
e.g. http://frag.hosttv.com/frag/1/H8QVGAH264/1270059632.mp4/fragment/42.

According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MP4 file has a sequence number. Using this knowledge and a well defined URL structure for communicating with the server, the client requests fragments individually as if it was reading separate files from the server simply by requesting urls for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bit rate.

Because each request to the server looks like a request to a separate file, the response to requests can be cached in any HTTP Proxy, or be distributed over any HTTP based CDN.

Figure 4:
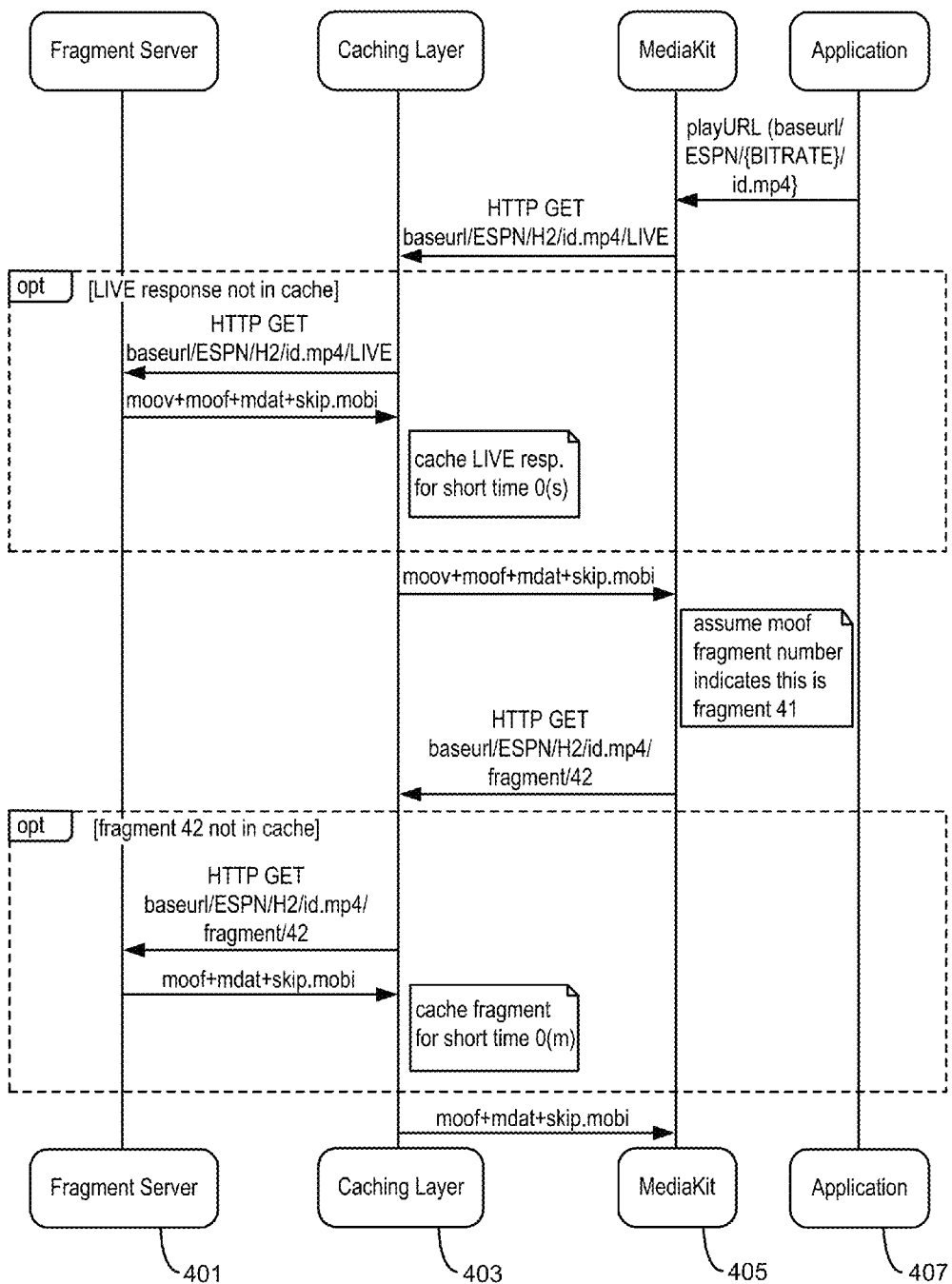
FIG. 4 illustrates one example of an exchange used with a media delivery system.

FIG. 4 illustrates an interaction for a client receiving a live stream. The client starts playback when fragment 41 plays out from the server. The client uses the fragment number so that it can request the appropriate subsequence file fragment. An application such as a player application 407 sends a request to mediakit 405. The request may include a base address and bit rate. The mediakit 405 sends an HTTP get request to caching layer 403. According to various embodiments, the live response is not in cache, and the caching layer 403 forward the HTTP get request to a fragment server 401. The fragment server 401 performs processing and sends the appropriate fragment to the caching layer 403 which forwards to the data to mediakit 405.

The fragment may be cached for a short period of time at caching layer 403. The mediakit 405 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 405 may request a next fragment having a different data rate. In some instances, the mediakit 405 may request a next fragment having a higher data rate. According to various embodiments, the fragment server 401 maintains fragments for different quality of service streams with timing synchronization information to allow for timing accurate playback.

The mediakit 405 requests a next fragment using information from the received fragment. According to various embodiments, the next fragment for the media stream may be maintained on a different server, may have a different bit rate, or may require different authorization. Caching layer 403 determines that the next fragment is not in cache and forwards the request to fragment server 401. The fragment server 401 sends the fragment to caching layer 403 and the fragment is cached for a short period of time. The fragment is then sent to mediakit 405.

Figure 5:
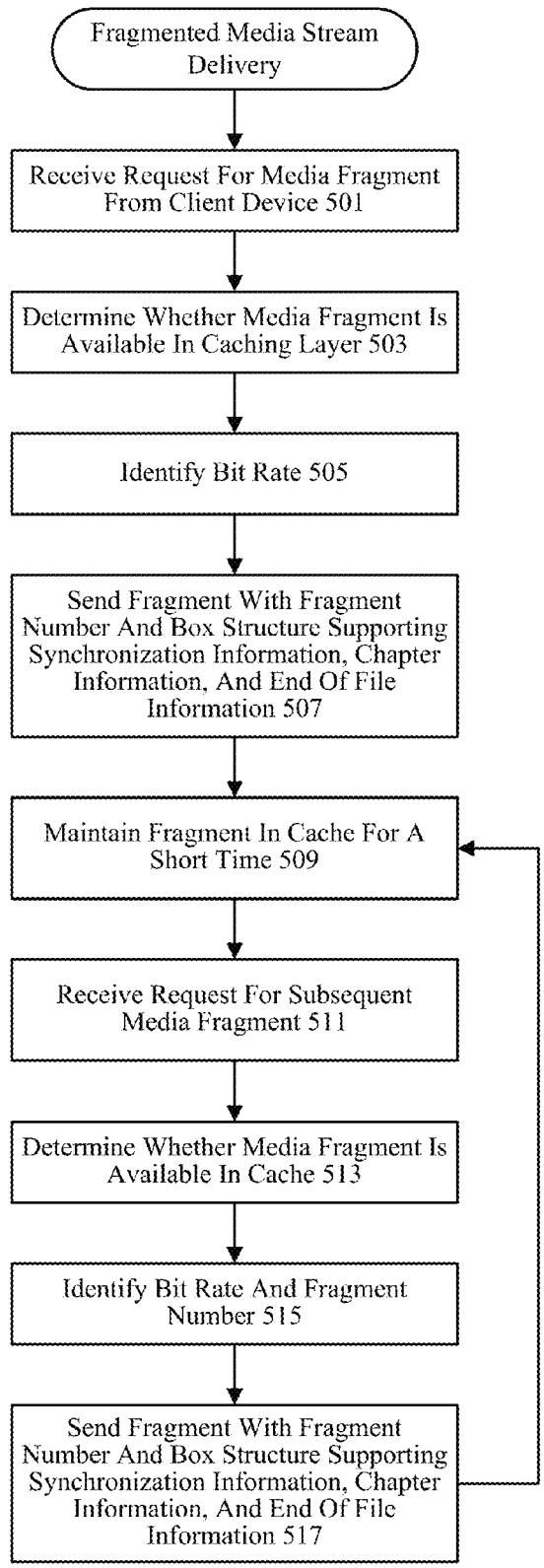
FIG. 5 illustrates one technique for fragmented media stream delivery.

FIG. 5 illustrates one example of a technique for delivering media stream fragments. According to various embodiments, a request for a media stream is received from a client device at 501. In particular embodiments, the request is an HTTP GET request with a baseurl, bit rate, and file name. At 503, it is determined if any current fragments associated with the requested media stream are available. According to various embodiments, fragments are cached for several minutes in a caching layer to allow for near live distribution of media streams. At 505, the bit rate associated with the request is identified. According to various embodiments, a current fragment for the media stream is obtained and sent with a fragment number and a box structure supporting synchronization information, chapter information, and end of file information at 507. It should be noted that not every fragment includes synchronization, chapter, and end of file information.

According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

At 509, the transmitted fragment is maintained in cache for a limited period of time. At 511, a request for a subsequent fragment is received. According to various embodiments, the subsequent fragment a fragment number directly related to the fragment previously transmitted. In some examples, the client device may request a different bit rate or may request the same bit rate. At 513, it is determined if a fragment with the appropriate fragment number is available in cache. Otherwise, the bit rate and fragment number are determined in order to obtain the appropriate fragment at 515. In some examples, the fragment number is one greater than the fragment number for the previous fragment transmitted.

In some examples, the client device may request a significantly different fragment number corresponding to a different time index. This allows a client device to not only quality shift by requesting a different bit rate, but time shift as well by requesting a prior segment already transmitted previously. According to various embodiments, a current fragment for the media stream is obtained and sent with a fragment number and a box structure supporting synchronization information, chapter information, and end of file information at 517.

The system can then await requests for additional fragments associated with near live streams.

Figure 6:
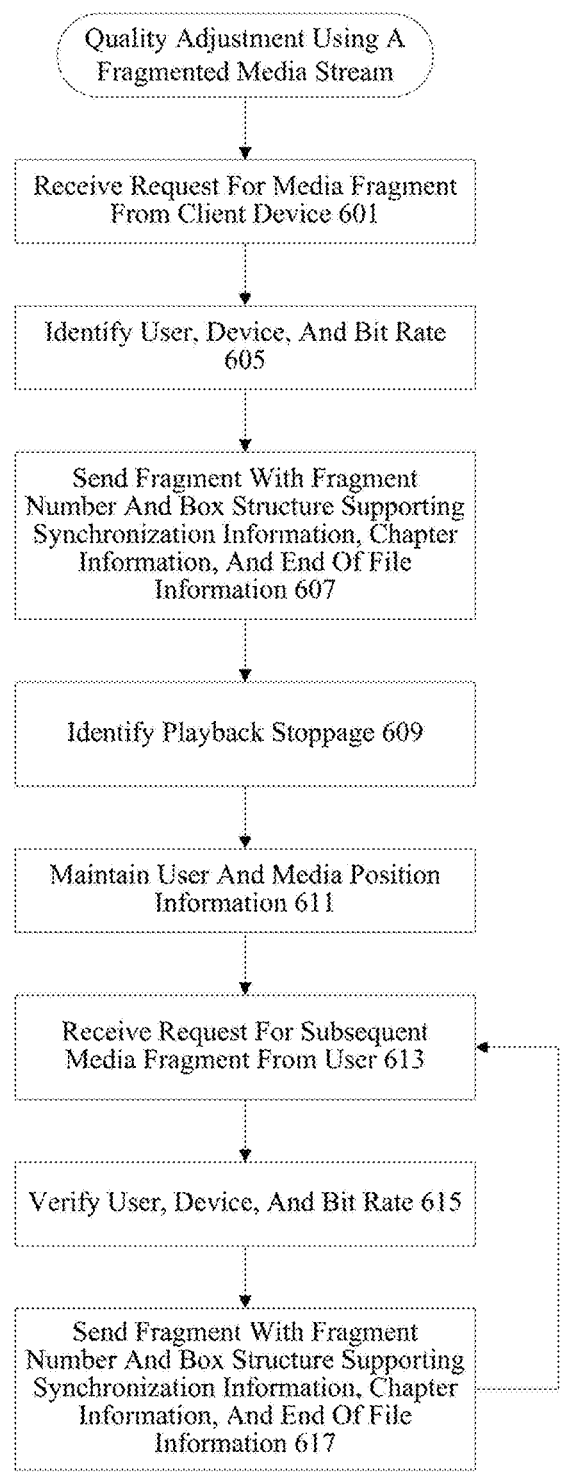
FIG. 6 illustrates one technique for implementing quality adjustment with a fragmented media stream.

FIG. 6 illustrates one technique for performing quality adjustment using a fragmented media stream. At 601, a request is received for a media fragment from a client device. The request may be an HTTP GET request including a particular bit rate and media identifier. At 605, a content server or fragment server identifies the bit rate and the media. According to various embodiments, the content server also identifies the user and device to verify that the user is authorized to view the media content on the particular device. In some examples, the user and device are identified to determine the appropriate quality media stream or version of the media stream to provide to the client device. At 607, a fragment is sent with a fragment number and a box structure supporting synchronization information, chapter information, and end of file information.

According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

At 609, playback stoppage is identified. Playback stoppage may be identified by a client device request to stop playback. In other embodiments, playback stoppage may be identified when a content server does not receive a request for additional media fragments within a predetermined period of time from the client device. In still other embodiments, playback stoppage may be identified when a content server does not receive an appropriate acknowledgement from a client device. At 611, user and media position information is maintained. In some embodiments, bit rate, version, device, and other quality and location information can be maintained.

At 613, a request for a subsequent media fragment is received from a user. According to various embodiments, the request is received from a different device, or may be received over network conditions that now support a different bit rate. At 615, the user, device, and bit rate authorized are identified. According to various embodiments, user and media position information is obtained. At 617, the fragment with a subsequent fragment number corresponding to the maintained media position information is sent with a box structure supporting synchronization information, chapter information, and end of file information. In some examples, not all synchronization information, chapter information, and end of file information needs to be sent. In some examples, the box structure may only include synchronization information while supporting but not including other types of information.

FIG. 7 illustrates one example of a fragment server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server 791 handles requests and responses for media content related transactions while a separate streaming server provides the actual media streams.

Although a particular fragment server 791 is described, it should be recognized that a variety of alternative configurations are possible. For example, some modules such as a report and logging module 753 and a monitor 751 may not be needed on every server. Alternatively, the modules may be implemented on another device connected to the server. In another example, the server 791 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:
1. A system, comprising:
a fragment server configured to receive a request from a user to access a piece of media content at a first service level, the fragment server including a processor, the fragment server configured to fragment MPEG-4 files without out of band signaling, wherein a box structure is provided to include synchronization information and end of file information, wherein synchronization information is used to synchronize audio and video when playback entails starting in the middle of a stream and end of file information signals when the current program or file is over;

a storage device configured to maintain a service level authorized for the user;

wherein the fragment server is configured to access the storage device to determine whether the user is authorized to receive media content at a first service level at a first device and whether the user is authorized to receive media content at a second service level at a second device, wherein if the user is authorized to receive the media content at the second service level, the media content is transmitted to the second device.

2. The system of claim 1, wherein the media content transmitted to the first device comprises a media stream group of pictures (GOP), the GOP including a plurality of MPEG-4 fragments corresponding to a first quality level.

3. The system of claim 2, wherein the media content transmitted to the second device comprises a media stream group of pictures (GOP), the GOP including a plurality of MPEG-4 fragments corresponding to a second quality level.

4. The system of claim 1, wherein the media content transmitted to the second device corresponds to media content transmitted to the first device.

5. The system of claim 1, wherein the position where playback is stopped at the first device is identified.

6. The system of claim 1, wherein the media content transmitted to the second device begins where playback is stopped at the first device.

7. The system of claim 1, wherein the first device is a mobile device.

8. The system of claim 7, wherein the second device is a set top box.

9. The system of claim 7, wherein the second device is associated with a television screen.

10. The system of claim 1, wherein if the user is not authorized to receive the media content at the second service level, a message is transmitted to the user.

11. A method, comprising:
identifying a user;
authorizing the user to access a piece of media content at a particular service level by using a fragment server configured to fragment MPEG-4 files;
receiving a first request from a first device to receive the media content, the request associated with a first service level, wherein the first request is received at the fragment server, the fragment server configured to fragment MPEG-4 files without out of band signaling, wherein a box structure is provided to include synchronization information and end of file information, wherein synchronization information is used to synchronize audio and video when playback entails starting in the middle of a stream and end of file information signals when the current program or file is over;
determining that the user is authorized to receive the media content at the first service level by accessing stored service level authorized for the first device;
transmitting the media content to the first device;
receiving a second request from a second device to receive the media content, the request associated with a second service level;
determining whether the user is authorized to receive the media content at the second service level by accessing stored service level authorized for the second device, wherein if the user is authorized to receive the media content at the second service level, the media content is transmitted to the second device.

12. The method of claim 11, wherein the media content transmitted to the first device comprises a media stream group of pictures (GOP), the GOP including a plurality of MPEG-4 fragments corresponding to a first quality level.

13. The method of claim 12, wherein the media content transmitted to the second device comprises a media stream group of pictures (GOP), the GOP including a plurality of MPEG-4 fragments corresponding to a second quality level.

14. The method of claim 11, wherein the media content transmitted to the second device corresponds to media content transmitted to the first device.

15. The method of claim 11, wherein the position where playback is stopped at the first device is identified.

16. The method of claim 11, wherein the media content transmitted to the second device begins where playback is stopped at the first device.

17. The method of claim 11, wherein the first device is a mobile device.

18. An apparatus, comprising:
means for identifying a user;
means for authorizing the user to access a piece of media content at a particular service level;
means for receiving a first request from a first device to receive the media content, the request associated with a first service level, wherein the first request is received at a fragment server, the fragment server configured to fragment MPEG-4 files without out of band signaling, wherein a box structure is provided to include synchronization information and end of file information, wherein synchronization information is used to synchronize audio and video when playback entails starting in the middle of a stream and end of file information signals when the current program or file is over;
means for determining that the user is authorized to receive the media content at the first service level by accessing stored service level authorized for the first device;
means for transmitting the media content to the first device;
means for receiving a second request from a second device to receive the media content, the request associated with a second service level;
means for determining whether the user is authorized to receive the media content at the second service level by accessing stored service level authorized for the second device, wherein if the user is authorized to receive the media content at the second service level, the media content is transmitted to the second device.

* * * * *